United States Patent [19]

Jachimowicz et al.

[11] Patent Number: 4,526,936

[45] Date of Patent: Jul. 2, 1985

[54] PROCESS FOR THE PREPARATION OF POLYMERIC AMINE CONTAINING PRODUCTS

[75] Inventors: Felek Jachimowicz; Per E. A. Hansson, both of Columbia, Md.

[73] Assignee: W. R. Grace & Co., New York, N.Y.

[21] Appl. No.: 476,773

[22] Filed: Mar. 18, 1983

[51] Int. Cl.$^3$ ............................................... C08F 8/32
[52] U.S. Cl. ................................ 525/379; 525/333.1; 525/333.2
[58] Field of Search ........................................ 525/379

[56] References Cited

U.S. PATENT DOCUMENTS 4,312,965  1/1982  Jachimowicz et al. ............. 525/379

*Primary Examiner*—Joseph L. Schofer
*Assistant Examiner*—Bernard Lipman
*Attorney, Agent, or Firm*—Howard J. Troffkin

[57] ABSTRACT

A process of forming polymeric products having a high degree of pendant secondary or tertiary alkylene amino groups by contacting, in a liquid media, a hydrocarbon polymer having olefinic groups therein with a primary or secondary amine, carbon monoxide and hydrogen in the presence of a catalytic amount of a Group VIII metal compound.

15 Claims, No Drawings

PROCESS FOR THE PREPARATION OF POLYMERIC AMINE CONTAINING PRODUCTS

BACKGROUND OF THE INVENTION

The present invention relates to the preparation of amino substituted polymeric hydrocarbons and, more particularly, to a process for forming polymeric products having a hydrocarbon backbone and a large amount of pendant secondary and/or tertiary alkyleneamine groups by the reaction of polymeric hydrocarbons having olefinic groups therein with hydrogen, carbon monoxide, and a primary and/or secondary amine in the presence of a catalytic amount of a Group VIII metal compound.

Catalytic aminomethylation of monoolefins with monomeric secondary monoamines, carbon monoxide and hydrogen is well known and was initially taught by Dr. Walter Reppe in *Experimentia*, Vol. 5, p. 93 (1949); German Pat. No. 839,800 (1952) and *Liebigs Ann. Chem.*, Vol. 582, p. 148 (1953). The process was, however, of limited value due to the required use of large quantities of toxic iron or nickel carbonyls as the catalyst, the rapid rate of consumption of the catalyst, the slow rate of reaction, poor selectivity and the poor yields of product. Moreover, the reaction was taught to be restricted to monoolefins and to low molecular weight monoamines.

Aminomethylation of other monoolefins has been carried out in the presence of other metal carbonyls, but the reactions have been found to be non-selective and produce, at best, only moderate yields of amines. For example, U.S. Pat. Nos. 2,422,631 and 3,234,283 disclose that lower olefins, carbon monoxide, hydrogen, and a secondary monoamine will form, in low yields, tertiary amines in the presence of cobalt hydrocarbonyl or dicobalt octocarbonyl as well as certain other cobalt compounds.

More recently, U.S. Pat. Nos. 3,513,200 and 4,096,150 have disclosed the utilization of Group VIII metal compounds as suitable compounds to catalyze the reaction between monoamines and monoolefins with hydrogen and carbon monoxide to form low molecular weight monomeric tertiary amines. These reactions, however, generally only provide the desired product in low yields while forming significant amounts of by-products.

In addition, U.S. Pat. No. 4,312,965 may be referred to as teaching the formation of a polymeric product having a mixture of amine and amide pendant groups by contacting a polymer with an amine, carbon monoxide and water in the presence of a rhodium metal compound. The required use of water as the hydrogen source and rhodium as the catalytic metal is taught to provide a means of aminomethylation of the polymeric polyolefin. The process, however, yields a product having low degrees of amine incorporation and, therefore, does not provide for a highly active polymer normally desired for commercial utilization. The above and other references teach that aminomethylation generally leads to the formation of significant quantities of undesired by-products. This is confirmed in general treatises such as: "Carbon monoxide in Organic Synthesis" of Falbe.

In general, the yields of desired amine incorporation in previously formed polymeric material and of monomeric amine products by aminomethylation has been viewed by those skilled in this art as being poor at best.

SUMMARY OF THE INVENTION

The present invention is directed to a one-step, cost efficient method of forming polymeric products having a hydrocarbon backbone and a high degree of alkylene alkylamine pendant groups by contacting, in a liquid media, a polymer having unsaturated groups therein, a primary or secondary amine, carbon monoxide and hydrogen gas in presence of a Group VIII organometallic compound. The formed product is useful for a variety of applications, e.g. as a surfactant, a flocculating agent, softener, and as a component in coating compositions.

DETAILED DESCRIPTION OF THE INVENTION

The subject invention is directed to a new one-step, cost efficient catalytic method of forming polymeric polyamines having a structure of a hydrocarbon backbone and pendant amino groups which are connected to the polymer backbone by an alkylene bridge. The method is achieved by contacting, in an inert solvent, a polymer having a multiplicity of olefinic unsaturation therein, hydrogen, carbon monoxide and a primary or secondary amine in the presence of a Group VIII metal compound as more completely described hereinbelow.

The aminomethylation of the olefinic containing polymer has been unexpectedly found to produce a polymer product having a high degree of incorporation of alkylene alkylamine pendant groups when formed according to the presently described method requiring the utilization of hydrogen and the presence of at least one Group VIII organometallic compound as described hereinbelow. Although aminomethylation of polymeric materials has been previously described, in U.S. Pat. No. 4,312,965, as being capable of providing products having amine/amide pendant groups if one uses the required water and a rhodium metal compound as the catalyst, the process has several defects. The primary defect is one which is common to aminomethylation reactions (even when simple, small olefinic compounds and/or other catalyst materials are used), and that is the low degree of formation of amino containing compounds or low degree of incorporation of amino groups onto the polymer product by the process described in U.S. Pat. No. 4,312,965. In contrast, it has been presently unexpectedly found that by performing the aminomethylation using the conditions described herein, specifically, using a single organic liquid phase, hydrogen as the hydrogen source and Group VIII organometallic compounds as the catalyst, one unexpectedly achieves a polymeric product having a combination of desired properties. The polymeric product presently attained has (a) a higher degree of alkylene alkylamine pendant groups therein than possible by prior known methods, (b) substantially no residual amount of olefinic groups in the backbone of the polymer, (c) substantially no amido groups (a generally undesired group due to its inactivity or substantially low activity with respect to polyamine utilities), (d) absence of Schiff's base, aldehyde and enamine groups normally found in small amounts in prior art aminomethylation products and (e) increased stability of the polymeric polyamine product and reduced tendency to gel in comparison to products formed by prior art methods.

The present process has also been unexpectedly found very effective in forming polymeric polyamines with high concentration of alkylene amine groups from high molecular weight olefinic containing polymers. Such ability provides a method to produce unique amine polymers of high molecular weight. Finally, the instant process, due to its high efficiency in incorporating amines into the polymeric reactant, has been found useful in forming unique amine containing polymers having substantial amine groups therein even when the olefinic concentration is low in the polymer reactant (e.g. EPDM polymers).

The olefinic containing polymers useful herein can be formed from monomers having multiple olefinic groups therein alone (homopolymers), or in combination with other monomers, by conventional cationic, anionic, free radical, coordination or supported metal catalytic processes, as are well known by the artisan. The term "olefinic containing polymer" or "olefinic prepolymer", as used herein, is meant to define homopolymers and copolymers which contain a multiplicity of olefinic bonds distributed throughout the polymer chain either as a part of the polymer backbone or as a part of the pendant group. The average molecular weight of the olefinic containing polymer should be at least about 500 and preferably from about 500 to 200,000 and above. The subject process has been found to be an especially effective method when processing high molecular weight olefinic containing polymers having an average molecular weight of from about 10,000 to 200,000 to readily provide a high molecular weight polymeric polyamine. Incorporation of amino groups in high molecular weight polymer starting materials is difficult, at best, by previously known techniques.

The olefinic containing polymers useful herein can be homopolymers formed from $C_4$ to $C_{10}$ monomers having multiple olefinic groups therein, such as, for example, from butadiene; isoprene, cyclopentadiene; dimers of cyclopentadiene; 1,3-pentadiene; 1,4-pentadiene; 1,3-hexadiene; 1,4-hexadiene; 1,5-hexadiene; 2,4-hexadiene; 1,3,5-hexatriene and the like, as well as such monomers containing substituents thereon which are inert with respect to aminomethylation, such as $C_1$–$C_3$ alkyl, halo and carbonyl radicals. The olefinic containing polymer used in the subject invention may be in any of their isomeric stereoconfigurations. In the case of polybutadiene, for example, it can be in its cis-1,4-; trans-1,4-; or trans-1,2 configuration or a mixture thereof. Further, the polymers useful herein may be copolymers formed from two or more monomer compounds which are each capable of forming a polymeric segment containing olefin bonds therein, such as copolymers having polybutadiene segments as, for example, copolymers of poly(butadiene-isoprene), poly(butadiene-1,4-pentadiene) and the like.

The olefinic containing polymers useful herein can also be copolymers formed from at least one monomer as described above capable of producing olefin containing polymer segments and at least one copolymerizable vinyl monomer which does not form olefin containing polymer segments, such as acrylamides, acrylonitrile, styrene, actylates, alkyl vinyl ethers, alkyl vinyl ketone and the like, and mixtures thereof, and $C_1$–$C_{20}$ hydrocarbyl derivates of such monomers, such as alphamethyl styrene, methyl methacrylate and the like. Such materials are formed in conventional manners by free radical, cationic or anionic polymerization techniques, as are well known. A large variety of these polymers can be readily obtained commercially, such as poly(butadiene-acrylonitrile), poly(butadiene-styrene), acrylonitrile-butadiene-styrene (ABS) resins, ethylene-propylene-diene (EPDM) polymers or the like. The olefinic containing polymers can be formed with non-olefin containing monomer groups in any degree desired as long as the resultant polymer contains sufficient amounts of olefinic bonds therein to act as an active precursor of the desired amine containing polymer product. It is desirable that the copolymers contain at least about 3 percent by weight of olefinic containing polymer segments therein and, preferably, that the copolymer contain at least about 30 percent by weight of the olefinic containing polymer segments.

The polymers found useful as reactants in accordance with the present process can also be formed from olefinic monomers such as propylene, butylene, cyclopentene decylene and the like which produce, through branching, isomerization and the like polymeric material having residual olefinic bonds therein. In addition, asphalts and asphaltene compositions can also be used herein. The particular olefinic containing polymer to be used will, of course, depend on the nature of the resultant polyamine polymers desired.

The primary or secondary amine group containing reactant can be selected from compounds having the formula:

wherein R is selected from hydrogen or a $C_1$–$C_{20}$ hydrocarbon radical, such as alkyl, aryl, alkaryl, aralkyl, and cycloalkyl groups, preferably a $C_1$–$C_6$ alkyl, aryl or cycloalkyl groups and $R^1$ is selected from a $C_1$–$C_{20}$, preferably a $C_1$–$C_6$ hydrocarbon radical as described with respect to R above. Illustrative examples of amines found suitable as a reactant in the present process are methylamine, ethylamine, propylamine, butylamine, n-pentylamine, hexylamine, decylamine, dodecylamine, dimethylamine, diethylamine, dipropylamine, diisopropyl amine, di-n-butylamine, diisobutylamine, dipentylamine, di-2,2,4-trimethylpentylamine, dihexylamine ethylhexylamine diheptylamine, dinonylamine, butylpentadecylamine, diphenylamine, ditolylamine, methylcumenylamine, dibenzylamine, aniline methyl-2-phenylethylamine, methylnapthylamine, diidenylamine, di-m-xylylamine, dioctenylamine, dipentenylamine, methylbutenylamine, dicyclopentylamine, di(methylcyclopentyl)amine, and butylcylococtylamine and the like. In addition, R and $R^1$ can be joined to form a single alkylene radical having from 2 to 6 carbon atoms, as illustrated by pyrrolidine and the like. Each R and R′ or the joined R-R′ alkylene radical can contain hetero atoms or groups which are substantially non-reactive with respect to the aminomethylation reaction as presently described. Such heteroatoms can be oxygen, sulfur or tertiary or hindered secondary nitrogen and the like and such groups can be ethers alcohols, thioalcohols, thioethers, amido, cyano, tertiary amino and sterically hindered secondary amino groups. Illustrative examples of amine reactants containing such heteroatom or group are morpholine, aminoethanol, 4-amino-2,2,6,6-tetraalkyl piperidine and the like.

The reaction is performed under a liquid phase formed by an organic liquid which is a solvent for the polymer reactant and the amine. It is preferred that an anhydrous liquid phase be used. The presence of small (less than 5 percent of total liquid) amount of water may be tolerated but is not preferred as its presence tends to inhibit achieving the desired high degree of amine incorporation. Any suitable organic hydrocarbon liquid can be employed which is inert to the reaction conditions, the reactants, the catalyst and the products. Examples of suitable hydrocarbons include aromatic hydrocarbons such as benzene, toluene, xylene, ethyl benzene, tetraline, etc., aliphatic hydrocarbons such as butane, pentane, isopentane, hexane, isohexane, heptane, octane, isooctane, nephtha, gasoline, kerosene, mineral oil, etc., alicyclic hydrocarbons, such as cyclopentane, cyclohexane, methylcyclopentane, decalin, indane, etc.

Ethers can also be employed as the reaction solvent, such as diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, ethylene glycol diisoamyl ether, diethylene glycol diethyl ether, ethylbenzyl ether, diethylene glycol diethyl ether, diethylene glycol dimethyl ether, ethylene glycol diethyl ether, ethylene glycol diphenyl ether, triethylene glycol diethyl ether, diethylene glycol di-n-hexyl ether, tetraethylene glycol dimethyl ether, tetraethylene glycol dibutyl ether, dioxane, tetrahydrofuran etc.

Alcohols can also be employed as a reaction solvent. The alcohols can be any primary, secondary or tertiary alcohol which are liquid at both ambient and reaction conditions. It is preferred that the alcohol be a $C_1$–$C_8$ alcohol such as, for example methanol, ethanol, isopropanol, n-butanol, iso-butanol, t-butanol, t-amyl alcohol, 2-pentanol, 3-ethyl-2-pentanol and the like.

Tertiary amines can also be employed as the reaction solvent, the nitrogen atom, by definition, being substituted with three hydrocarbyl groups which are inert with respect to the reaction, such as, for example, alkyl, aryl, alkaryl, aralkyl groups and the like. Examples of suitable tertiary amines include triethylamine, tripropylamine, triisobutylamine, trihexylamine, triheptylamine, triamylamine, dibenzyl ethylamine, dibutyl ethylamine, dimethyl pentylamine, diphenyl ethylamine, diphenyl methylamine, dimethyl aniline, pyridine, dimethyl pyridine, methoxy pyridine, methyl pyrrolidine, ethyl pyrrolidine and the like.

The particular solvent to be used will depend on its ability to remain in the liquid state at both ambient and at reaction conditions to facilitate the mixing of the components, its solvating ability with respect to the polymer and amine reactants, and its ease of handling, as can be readily determined by the artisan.

The reaction is performed under relatively mild conditions including temperatures from about 100° to about 250° C.; preferably from about 125° to about 200° C. Sufficient pressure should be used to maintain the reaction medium in a liquid phase. The reaction should be carried out at a pressure of from about 30 to about 300 atmospheres and, preferably, from about 30 to 150 atmospheres. The pressure can be maintained by the pressure of the carbon monoxide and hydrogen supplied to the reaction zone. If desired, a suitable inert gas, such as nitrogen, can also be charged to the reaction zone to increase the pressure within the reaction zone.

The ratio of the reactants can be widely varied. The mole ratio of hydrogen to olefinic double bonds should be at least about 2:1 with from about 2:1 to 20:1 being preferred. The molar ratio of carbon monoxide to olefinic double bond should be at least 1:1. The carbon monoxide can be used in excess to form sufficient pressure required in the reaction zone, as described above. Finally, the mole ratio of amine reactant to olefinic double bond contained in the polymer should be at least about 1:1 or greater and preferably from at least about 1.2:1 or greater with from about 1.2:1 to 20:1 being most preferred.

The catalyst required to be used in the present method to achieve the high degree of amine incorporated polymer product comprises at least one compound having a Group VIII metal of the Periodic Chart therein (the term "Group VIII metal compound" or "catalyst" as used herein is meant to describe such compounds). Such Group VIII metal compounds can be inorganic compounds, such as, for example, Group VIII metal salts, oxides, carbonyls and the like. The Group VIII metal compound can be an organometallic such as, for example, (although rhodium metal organometallic compounds are given here for illustrative purposes it is understood that other similar Group VIII metal compounds can be used) tetrarhodium dodecacarbonyl, hexarhodium hexadecacarbonyl, tris(dimethylphenylphosphine) norbornadiene rhdodium hexafluorophosphate, bis(1,2 diphenylphosphino) ethane norbornadiene rhodium perchlorate, chlorobis(ethylene) rhodium dimer, chloro(1,5-cyclooctadiene) rhodium dimer, chlorodicarbonylrhodium dimer, chloropentaaminerhodium chloride, hydridocarbonyl tris(triphenylphosphine) rhodium, rhodium acetate dimer, rhodium acetylacetonate, sodium hexachlororhodate hydrate, dicarbonylacetylacetonato rhodium, chlorocarbonylbis(triphenylphosphine) rhodium, chlorochiorbonyl p-toluidine rhodium and trichloro rhodium pyridine. The preferred catalyst to be used by the present process are formed from Group VIII metal compounds of the metals, rhodium, ruthenium and iridium and most preferably those formed from a mixture of at least two compounds of Group VIII metals selected from rhodium, ruthenium or iridium. When mixtures of compounds are used it is preferred that a rhodium containing compound be present and be the minor component of the mixture. The most preferred catalyst used in the present process are mixtures of a rhodium compound and a ruthenium compound. Of such mixtures the best catalytic activity is attained when the ratio of rhodium metal atom to ruthenium metal atom is less than about 0.5.

The exact chemical and physical composition of the entity which acts as the catalyst for the subject reaction is not known with certainty because of the possible restructuring and/or interaction of the metal compound and the reactants contained in the reaction zone. Whether the Group VIII compounds described herein acts directly as the catalyst or as the precursor for the catalyst entity which causes the presently desired aminomethylation is immaterial. The subject Group VIII metal compounds will be referred herein as the "catalyst" as they have unexpectedly been found, when used with hydrogen, to directly and/or indirectly provide the desired polymers having high amine incorporation by the present one-step process and to give the desired product in good yields.

The catalyst found useful in the subject process can be a Group VIII metal salt of an inorganic acid such as, for example, a chloride, nitrate, sulfate, perchlorate or the like inorganic salt or of an organic acid salt such as an acetate or the like. The salts are well known commercial products formed conventionally by the reaction of the metal oxide with an acid. The salt can be used in its anhydrous state or as a hydrated salt.

The catalyst of the subject process can be an organometallic compound. Such compounds can be formed in coordination with the metal in any one of its valence states. The organometallic compounds are normally formed from chemical moieties which contain unshared electrons such as atoms selected from nitrogen, oxygen, phosphorous or sulfur or which contains unsaturation. The compounds can be in the form of a carbonyl; an olefin such as ethylene, butene and the like; diolefines, such as norbornodiene, cyclooctadien-1,5 and the like; aliphatic, aromatic, aryl aliphatic phosphites, such as triethyl phosphite, tributyl phosphite, trimethyl phosphite, triphenyl phosphite, dimethylphenyl phosphite, tritolyl phosphite, tribenzyl phosphite, ditolyl phenyl phosphite, and the like; aliphatic, aromatic, aryl aliphatic phosphines such as triphenyl phosphine and the like wherein the phosphine to metal is equal or less than 3; aliphatic and cyclic ethers such as dimethyl and diethyl oxide, dioxane, dialkyl ether glycols, acetyl acetone and the like; primary, secondary, and tertiary amines which contain alkyl, aryl, alkaryl, arallayl cycloalkyl groups or mixtures thereof such as trimethyl amine, diethyl amine, toluidine and the like; heterocyclic bases such as pyridine, and the like; ammonia, sulfides such as dialkyl, diaryl, alicyclic heterocyclic sulfides and the like and mixtures thereof. When the compound is formed from uncharged ligand components with a charged Group VIII metal, the compound is formed into a stable neutral state with an anion such as a chloride, perchlorate, nitrate, hexaflourophosphate and the like.

The catalyst can be added directly to the reaction liquid phase either prior to, with or subsequent to the introduction of other required reactants. The Group VIII metal compound which are useful as a catalyst in the present process must have some degree of solubility in the liquid media in which the subject aminomethylation takes place. The choice of liquid media and/or catalyst to be used in a particular reaction so that the catalyst has some degree of solubility can be readily determined by the artisan using conventional methods.

The catalyst has been found to be effective to cause the formation of the desired polymeric polyamines as described above when used in a molar ratio of Group VIII metal atom to olefin bond of from about $1 \times 10^{-5}$ to $2.5 \times 10^{-3}$ and preferably from about $1 \times 10^{-5}$ to $1 \times 10^{-3}$. The most preferred range from both effectiveness and economy is from $5 \times 10^{-5}$ to $5 \times 10^{-4}$. Although greater amounts of catalyst can be used, such has not been found required.

The process is carried out by contacting the above described reactants and the catalyst in a vessel which is preferably adapted for gas injection, agitation and heating. The polyolefin, the amine, and the catalyst are added to the solvent and the reaction mixture is pressurized and heated. The reactor and its contents are maintained at the desired elevated temperature and pressure for a sufficient period to cause the formation of the desired polymeric secondary amine. The vessel is then cooled and when appropriate, degassed and the polymeric product is recovered by standard technique such as by precipitation in a non-solvent or extraction and drying in a vacuum. For additional purification the product may be further subjected to fractional precipitation and the quantity of desired product may be determined by standard analytical techniques.

The following examples are given for illustrative purposes only and are not meant to be a limitation on the subject invention as defined in the appended claims. All parts and percentages are by weight unless otherwise indicated.

The preparations of polymeric polyamines were conducted using, unless otherwise indicated hereinbelow, 0.75 part (14 mmole C=C) polybutadiene with 22.4 mmoles amine reactant in the presence of a Group VIII metal catalyst as specifically indicated below. The reactants were diluted with tetrahydrofuran to form a 10 ml mixture. The mix was charged into a 150 ml Hoke cylinder reactor which was then pressurized with CO and $H_2$ in a 1:1 molar ratio to 1000 psi. The reactor was heated to 150° C. and maintained there for a period of 4 hours. The polymer product was recovered from the reaction mixture by organic solvent/water extraction.

The product was analyzed by standard Nuclear Magnetic Resonance (NMR) using a Varian EM 390. In addition, selective determination of amine incorporation was done by the standard techniques of (a) determining the total amine incorporation by direct titration with hydrochloric acid in isopropanol; (b) determining secondary and tertiary amine content by first reacting any residual primary amine present with salicyladehyde and then titration with hydrochloric acid in isopropanol for secondary and tertiary amine content; and (c) treating a sample with phenylisothiocyanate to react primary and secondary amines and then titrate with hydrochloric acid in isopropanol to determine concentration of tertiary amino groups in the polymer product. The results from a, b, and c allows one to calculate primary, secondary and tertiary amino groups, as appropriate, for the reactant and product.

EXAMPLE 1

A series of products were formed from polybutadiene with a variety of amines, of liquid reaction media, of concentration of catalyst, of temperature and of polymer molecular weight. The amine to olefinic double bond molar ratio was 1.6. The reactants were dissolved in tetrahydrofuran or N-methyl pyrrolidine. The reactants were added to a 150 ml Hoke cyclinder reactor, pressurized with $CO/H_2$ in a 1:1 molar ratio or with equal amount of CO with inert gas ($N_2$) where water was used in lieu of $H_2$ for comparative purposes. The reactor was heated to the indicated temperature for a period of 5 hours, cooled and the product recovered and analyzed by titration and NMR. For each of the reactions, a duplicate back-to-back comparative reaction was conducted to show the benefit of using the combination of a Group VIII metal catalyst with hydrogen instead of the combination of the metal and water.

Further, samples of series 1, 2 and 3 further show that the resultant product has a significant reduction in residual unsaturation in the polymers and thereby forms a more stable material.

The results are listed in Table I below.

TABLE I

Comparison of Polyamine Synthesis in Presence of Hydrogen vs. Water

| Sample | Hydrogen Source | Polymer[a] MW g/mol | Amine | Solvent[c] | Catalyst[d] (4) | C=C/Rh | Temp. °C. | Product[e] % AI | % Unsat. |
|---|---|---|---|---|---|---|---|---|---|
| 1 | $H_2$ | 1000 | Morpholine | THF | RhH | 2000 | 125 | 42 | 15 |
| 1 | $H_2O$ | 1000 | Morpholine | THF | RhH | 2000 | 125 | 10 | 60 |
| 1(c') | $H_2O$ | 1000 | Morpholine | THF | RhH | 2000 | 150 | 4 | 8 |
| 2 | $H_2$ | 1000 | Morpholine | THF | Rh⊕ | 2000 | 125 | 30 | 15 |
| 2(c) | $H_2O$ | 1000 | Morpholine | THF | Rh⊕ | 2000 | 125 | 10 | 67 |
| 3 | $H_2$ | 1000 | Morpholine | NMP | Rh⊕ | 2000 | 125 | 42 | 25 |
| 3(c) | $H_2O$ | 1000 | Morpholine | NMP | Rh⊕ | 2000 | 125 | 10 | 67 |
| 4 | $H_2$ | 1000 | Dimethylamine | THF | $Rh_6$ | 2000 | 150 | 49 | |
| 4(c) | $H_2O$ | 1000 | Dimethylamine | THF | $Rh_6$ | 2000 | 150 | 5 | |
| 5 | $H_2$ | 2600[b] | Dimethylamine | THF | $Rh_6$ | 1000 | 125 | 64 | |
| 5(c) | $H_2O$ | 2600 | Dimethylamine | THF | $Rh_6$ | 1000 | 125 | 6 | |
| 6 | $H_2$ | 2600 | Dimethylamine | THF | $Rh_6$ | 1000 | 150 | 75 | |
| 6(c) | $H_2O$ | 2600 | Dimethylamine | THF | $Rh_6$ | 1000 | 150 | 4 | |

[a]Phenyl terminated polybutadiene, 25% vinyl, 99% unsaturation
[b]50% vinyl, 25% trans, 99% unsaturation
[c]THF = tetrahydrofuran; NMP = N—methylpyrrolodine
[d]RhH = RhH(CO) (Pφ3)3, $Rh_6$ = $Rh_6(CO)_{16}$, Rh⊕ = [Rh(NBD) (Ph(CH3)2)3]PF6(NBD - norbornadiene)
[e]AI = Amine incorporation; Unsat. = Unsaturation; % AI determined by selective titration; % Unsat. determined by 'H—NMR

EXAMPLE 2

0.75 part polybutadiene having a molecular weight of 1000, 1.30 parts isopropylamine, 0.0028 part $Rh_6(CO)_{16}$ was dissolved in tetrahydrofuran (15%) and the reaction mixture placed in a 150 ml Hoke cylinder which was pressurized to 1,000 psi with carbon monoxide and hydrogen ($CO/H_2=1:1$). The temperature was raised to 150° C. over 90 minutes and maintained there for 4.5 hours. The product mixture was analyzed by conventional titration methods, with standardized hydrochloric acid in isopropanol to determine the total amount of amino groups incorporated in the polymer and by selective titration to determine the ratio of secondary and tertiary amino groups. 51% of the double bonds were found to be aminomethylated. The ratio of secondary to tertiary amine was 4:1.

EXAMPLE 3

This reaction was carried out in the same way as described in Example 2, the difference being that 2.21 parts cyclohexylamine was used as starting material. 54.6% of the double bonds were found to be aminomethylated.

EXAMPLE 4

This reaction was carried out in the same way as described in Example 2, the difference being that 1.60 parts tert-butylamine was used as starting material. 48.9% of the carbon double bonds were found to be aminomethylated.

EXAMPLE 5

In each of the following series of samples polybutadiene and amine compound, as identified in the table below, (amine/C=C=1.6 molar ratio) were dissolved in tetrahydrofuran. $Rh_6(CO)_{16}$ was added in amount to provide one Rh atom per 500 C=C bonds. The reactants were added to a 150 ml Hoke cyclinder reactor or a 2 liter Magnadrive autoclave, as indicated, and then pressurized to 1000 psi with $CO/H_2$ in a 1:1 molar ratio. The reactor was heated to 150° C. for about 5 hours, cooled and the product recovered and analyzed. The results are given in Table II below.

TABLE II

Scope of the Aminomethylation Reaction in Respect to Different Polybutadienes as starting Materials[a]

| Mol. Wt.[a] g/Mol. | % cis +[e] trans units | % 1,2(Vinyl)[e] units | Nitrogen Source[b] | Amine Incorporation % |
|---|---|---|---|---|
| 4,500[c] | 55 | 45 | DMA | 70 |
| 14,000[c] | 20 | 80 | DMA | 53 |
| 30,000[c] | 20 | 80 | DMA | 51 |
| 156,000[c] | 100 | — | DMA | 49 |
| 1,000[d] | 10 | 90 | DMA | 82 |
| 3,000[d] | 10 | 90 | iPrAm | 84 |

[a]Molecular weight of the polybutadiene.
[b]DMA = dimethylamine, iPrAm = iso-propylamine
[c]150 ml Hoke cylinder used as reactor
[d]2 liter Magnadrive (Autoclave Engineering) autoclave used as reactor.
[e]double bond distribution of starting butadiene polymer.

EXAMPLE 6

A series of experiments were conducted according to the procedure of Example 5 above. The polymer used in each experiment was a phenyl terminated polybutadiene of MW of 1000 having 25% vinyl double bonds, 99% unsaturation. The amine was varied as indicated in Table III below. The amine incorporation was determined by selective titration method. Hydrogen was used in each experiment with $Rh_6(CO)_{16}$, as the Group VIII metal catalyst.

TABLE III

| Amine | Catalyst Conc. C = C per Group VIII metal | Polymer Amine Incorp. |
|---|---|---|
| Pyrrolidine | 2000 | 64 |
| Dimethylamine | 2000 | 49 |
| Isopropylamine | 1000 | 51 |
| Cyclohexylamine | 1000 | 55 |
| t-butylamine | 1000 | 49 |
| Methylamine | 500 | 63 |

EXAMPLE 7

A series of products were formed according to the procedure of Example 5 above except that the catalyst used was composed of a mixture of Group VIII metal compounds as indicated in Table IV below. In each case hydrogen was used as the hydrogen source to provide, in combination with the catalyst, a high incorporation of amino groups into the polymer. Sample 6c is included for comparative purposes to show that much lower amine incorporation is attained when water is used as the hydrogen source.

TABLE IV

Aminomethylation with Mixed Metal Systems

| Sample | Catalyst | Catalyst Amount[b] | Amine | Hydrogen Source | Polymer Amine Incorp. (%) |
|---|---|---|---|---|---|
| 1 | $RuCl_2(DMSO)/Rh^+$ | 500/5000 | DMA | $H_2$ | 61 |
| 2 | $RuCl_2(CO)_2(PO_3)_2/Rh^+$ | 500/5000 | DMA | $H_2$ | 80 |
| 3 | $RuH(OCOCH_2)(PO_3)_3/Rh^+$ | 500/5000 | DMA | $H_2$ | 74 |
| 4 | $Fe(CO)_5/Rh_6(CO)_{16}$ | 40/2000 | DMA | $H_2$ | 74 |
| 5 | $Ru(C_5H_7O_2)_3/Rh^+$ | 500/5000 | DMA | $H_2$ | 62 |
| 6 | $RuCl_2(PO_3)_3/Rh^+$ | 500/5000 | DMA | $H_2$ | 71 |
| 6(c) | $RuCl_2(PO_3)_3/Rh^+$ | 500/5000 | DMA | $H_2O$ | 26 |

[a] determined by selective titration
[b] [C = C]/[Metal]
$Rh^+ = [Rh(NBD)Ph((CH_3)_2)_3]PF_6$ (NBD = norbornadiene)
DMA = dimethylamine

What is claimed is:

1. A process of forming polymeric products having a hydrocarbon backbone and secondary or tertiary or mixed alkyleneamine pendant groups comprising contacting in a reaction zone, a mixture of an inert substantially anhydrous, organic liquid media, a polymeric hydrocarbon having olefinic groups present in its hydrocarbon backbone, a primary or secondary amine, carbon monoxide and hydrogen heating said mixture at a temperature of from about 100° C. to about 250° C. at a pressure of from about 30 to 300 atmospheres in the presence of a catalytic amount of at least one Group VIII metal containing compound for a sufficient period of time to cause the formation of the polymeric polyamine product, and recovering said polymeric polyamine product.

2. The process of claim 1 wherein the Group VIII metal containing compound is a mixture of compounds having at least two different Group VIII metals therein.

3. The process of claim 2 wherein at least one compound of said mixture is a rhodium compound.

4. The process of claim 2 wherein said mixture is selected from mixtures comprising a mixture of at least one rhodium compound with at least one ruthenium compound or a mixture of at least one rhodium compound and at least one iridium compound.

5. The process of claim 2 wherein the Group VIII metal containing compound is a mixture of at least two compounds, such that at least one compound is a rhodium containing compound and at least one compound is a ruthenium containing compound the ratio of rhodium to ruthenium is less than about 0.5.

6. The process of claim 2 wherein the polymeric hydrocarbon is selected from polybutadiene or polyisoprene.

7. The process of claim 2 wherein the amine reactant has the general formula:

wherein R is selected from hydrogen or a $C_1$–$C_{20}$ hydrocarbon radical, R' is selected from a $C_1$–$C_{20}$ hydrocarbon radical or R and R' are, in combination, a $C_2$–$C_6$ alkylene radical.

8. The process of claim 2 wherein the amine reactant is a $C_1$–$C_6$ primary or secondary amine selected from alkyl amines, heteroalkylamines cycloalkylamines and heterocycloalkylamines wherein the heteroatom is nitrogen, oxygen or sulfur.

9. The process of claim 2 wherein the amine reactant is an arylamine.

10. The process of claim 2 wherein the amine reactant is a compound in which each R and R' group is independently selected from a $C_1$–$C_6$ hydrocarbon radical.

11. The process of claim 2 wherein the molar ratio of carbon monoxide to olefinic double bond is at least about 1:1; of hydrogen gas to olefinic double bond is at least about 2:1; and of amine to olefinic double bond is at least 1:1.

12. The process of claim 11 wherein the molar ratio of CO to double bond is 1:1 to 20:1; of hydrogen to double bond is 2:1 to 20:1 and of amine to double bond is 1.2:1 to 20:1.

13. The process of claim 2 wherein the reaction temperature is from about 125° to 200° C. and the pressure is from about 30 to 150 atmospheres.

14. The process of claim 2 wherein the inert liquid contains up to 5 percent water therein.

15. The process of claim 2 wherein the inert liquid is anhydrous.

* * * * *